(12) United States Patent
Majewicz

(10) Patent No.: US 7,525,684 B2
(45) Date of Patent: Apr. 28, 2009

(54) COLOR CALIBRATION

(75) Inventor: Peter I. Majewicz, Emmett, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 955 days.

(21) Appl. No.: 10/685,276

(22) Filed: Oct. 14, 2003

(65) Prior Publication Data

US 2005/0078327 A1 Apr. 14, 2005

(51) Int. Cl.
*G06K 1/00* (2006.01)
*G06K 9/00* (2006.01)
*H04N 1/46* (2006.01)
*H04N 1/56* (2006.01)
*H04N 1/60* (2006.01)

(52) U.S. Cl. .................. 358/1.9; 358/501; 358/504; 358/515; 358/518; 358/520; 358/527; 358/537; 382/162; 382/163; 382/167

(58) Field of Classification Search .................. 358/1.9, 358/527, 518, 523, 529, 520, 532, 3.27, 525, 358/524, 537, 539, 540, 515, 504, 501, 1.1, 358/1.16; 399/81, 158; 345/418, 581, 838, 345/589; 382/165, 167, 162, 163
See application file for complete search history.

(56) References Cited

U.S. PATENT DOCUMENTS

| | | | |
|---|---|---|---|
| 5,212,546 A | 5/1993 | Arazi et al. | |
| 5,313,291 A | 5/1994 | Appel et al. | |
| 5,636,290 A | 6/1997 | Kita et al. | |
| 6,062,137 A | 5/2000 | Guo et al. | |
| 6,215,562 B1 | 4/2001 | Michel et al. | |
| 6,262,812 B1 * | 7/2001 | Chan et al. .................... 358/1.9 |
| 6,618,170 B1 * | 9/2003 | Whiting et al. ............... 358/1.9 |
| 2002/0136452 A1 * | 9/2002 | Schroder ..................... 382/165 |
| 2003/0002095 A1 * | 1/2003 | Gruzdev et al. ............. 358/518 |
| 2003/0098986 A1 * | 5/2003 | Pop ............................ 358/1.9 |
| 2004/0042019 A1 * | 3/2004 | Moro .......................... 358/1.9 |
| 2004/0119992 A1 * | 6/2004 | Falk et al. .................... 358/1.9 |
| 2004/0135790 A1 * | 7/2004 | Moore ......................... 345/589 |

OTHER PUBLICATIONS

Pictographics International Corporation, "iCorrect Professional" http://www.picto.com/iCorrectProfessional/iCorrectProfessionalDetails.htm, pp. 1-5, Accessed Mar. 23, 2003.
Pictographics International Corporation, "5a. Hue Selective Edit Tool: Memory Color Correction," http://www.picto.com/editlabtour/HueSelective1.html, p. 1, Accessed Mar. 19, 2003.

* cited by examiner

*Primary Examiner*—Edward L Coles
*Assistant Examiner*—Charlotte M Baker

(57) ABSTRACT

In one embodiment, a color calibration method includes rendering a color image, in response to a user selecting an adjustment to a color in the image, making a perceptually uniform adjustment to the color in the image, and rendering an adjusted color image reflecting the adjustment made to the color in the image.

4 Claims, 12 Drawing Sheets

COLOR CALIBRATION

FIELD OF THE INVENTION

The invention involves color calibration in monitors, printers and other color image rendering devices.

BACKGROUND

Some conventional color image manipulation software and some color image reproduction devices, such as printers and display monitors, allow the user to manually adjust colors in an image to more accurately reflect the actual color of objects in the image or to implement a user preference. Adjusting the colors in a display or print of image is often referred to as color calibration. Brightness, hue, saturation, color temperature, and neutral balancing are color characteristics commonly used to adjust the color in an image. Although adjusting these characteristics can be effective in achieving the desired image color, users may have difficulty obtaining the desired image color by adjusting these characteristics because the result of the adjustment is not intuitive. How the user perceives a change to one or more of these characteristics in one color or multiple colors in an image is often different from how the reproduction device makes the change. Consequently, the user may perceive a change in the adjusted display or print image different in quantity or quality, or both, from the expected change.

DESCRIPTION

"Rendering" as used in this document means printing or displaying.

"Or" as used in this document means one or the other or both unless explicitly stated otherwise.

INTRODUCTION: In various embodiments of the invention, memory colors and perceptually uniform color adjustments are used to improve or otherwise change color printing. A color printer may be calibrated to correct a problem with the printer or the printed image, to implement user color preferences, or to make any other color adjustments the user may deem necessary or desirable.

A "memory color" as used in this document means a color that is recognized and easily remembered by all persons with normal vision. The colors of many natural objects are examples of memory colors. For example, people recognize and easily remember the color of an orange (orange) or a banana (yellow).

In the sections to follow, embodiments of the present invention are described in the context of printing. Embodiments of the invention, however, are not limited to printing, but may be used in any environment in which is it necessary or desirable to calibrate color images.

Figure 1:
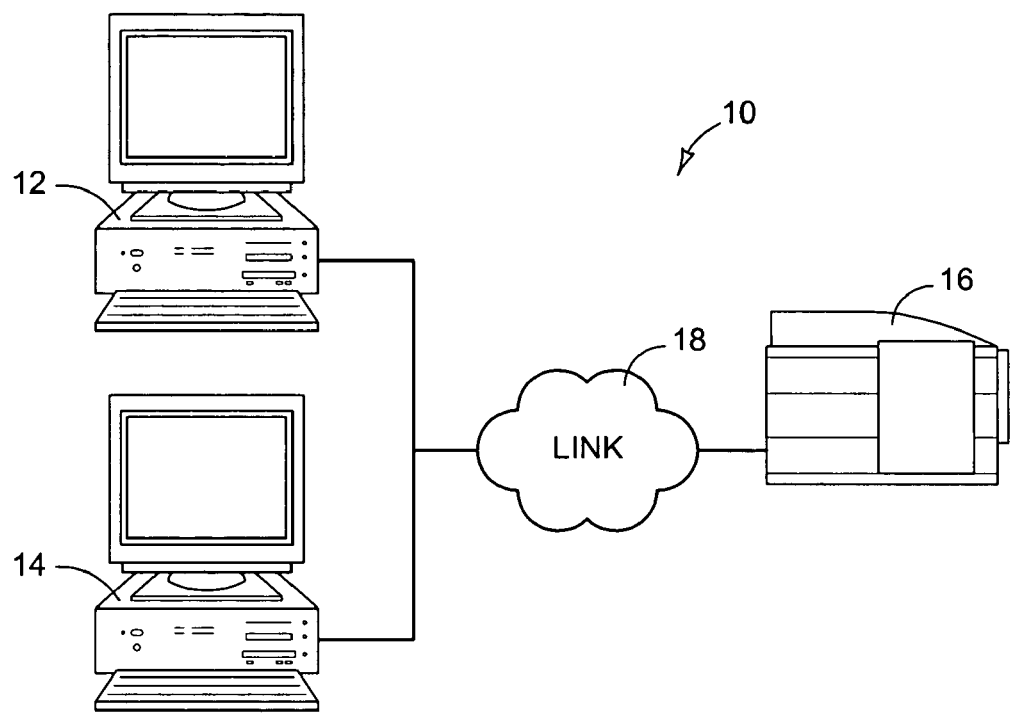
FIG. 1 is a schematic representation of a printing system that illustrates one environment in which embodiments of the invention may be implemented.

ENVIRONMENT: FIG. 1 illustrates a printing system 10 in which embodiments of the present invention can be implemented. System 10 includes input devices 12 and 14 and printer 16. Input devices 12 and 14 represent generally any computing device such as a desktop computer, laptop computer, or PDA (Personal Digital Assistant) capable of sending a print job to printer 16. Printer 16 represents generally any combination of hardware and programming capable of processing a print job and producing an image such as text and graphics on a media sheet such as paper or transparency. Examples of a printer 16 include laser printers, inkjet printers, copiers, and facsimile machines as well as multi-function devices. (A copier includes an input device (the scanner) integral to the copier.)

"Print job" refers to instructions directing printer 16 to produce images on some type of print media, usually paper. The instructions may include directions to form text, graphics, or a combination of both. The instructions may also include finishing directions such as direction to print multiple collated copies.

Input devices 12 and 14 and printer 16 are interconnected by link 18. Link 18 represents generally a cable, wireless, or remote connection via a telecommunication link, an infrared link, a radio frequency link, and/or any other connector or system that provides electronic communication between devices 12-16. Link 18 may represent an intranet, the Internet, or a combination of both.

Figure 2:
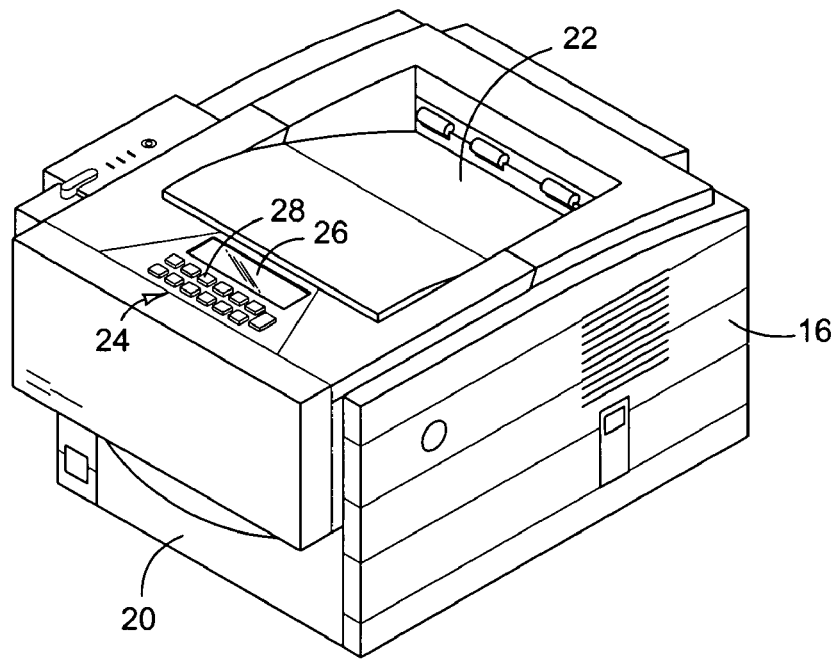
FIG. 2 is a perspective representation of a printer that illustrates a second environment in which embodiments of the invention may be implemented.

FIG. 2 illustrates a printer 16 in more detail. Referring to FIG. 2, printer 16 includes a media input tray 20, media output bin 22, and a control panel 24. Control panel 24, which serves as a direct user interface to printer 16, includes a small display 26 and keypad 28.

Figure 3:
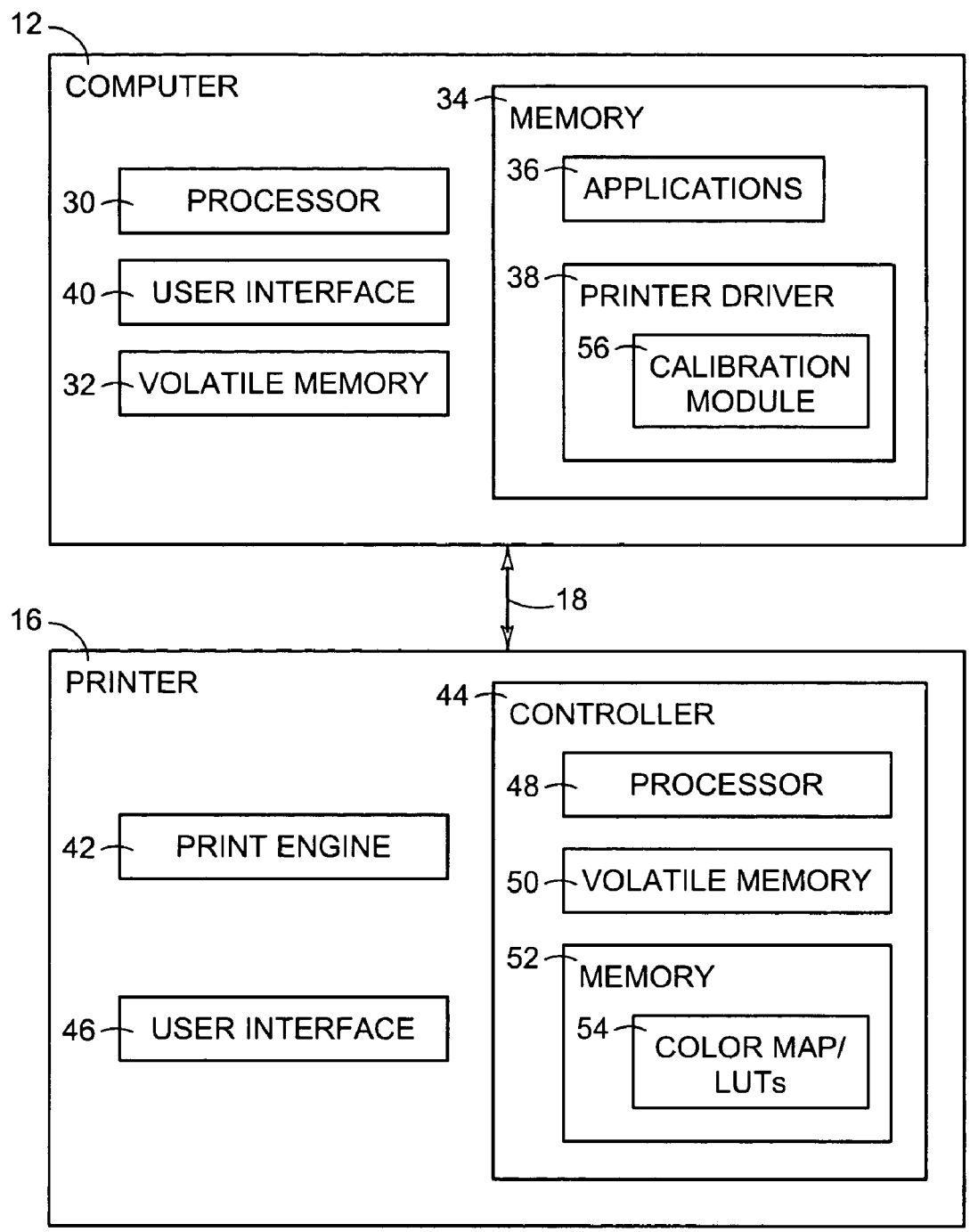
FIG. 3 is a block diagram showing components of a printer and client computer, such as the printer and input devices illustrated in FIG. 1, according to an embodiment of the invention in which the calibration module resides on the client computer.
Figure 4:
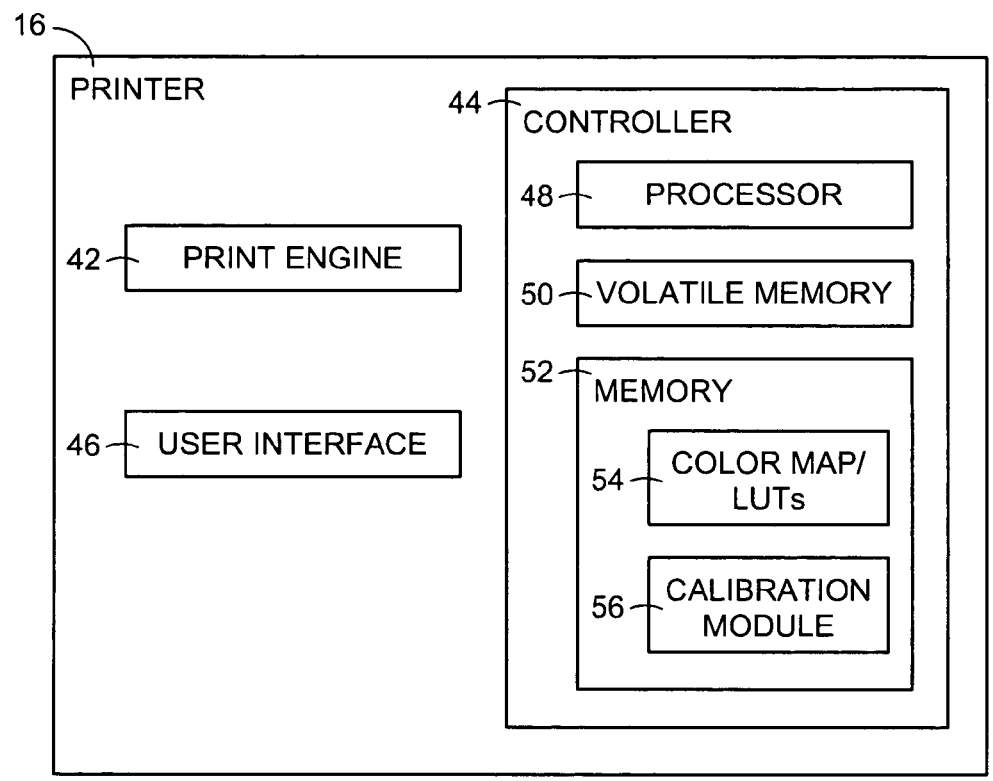
FIG. 4 is a block diagram showing components of a printer, such as the printer illustrated in FIG. 2, according to an embodiment of the invention in which the calibration module resides on the printer.

COMPONENTS: FIGS. 3 and 4 are block diagrams illustrating the components of two embodiments of the invention that may be implemented within the system 10 illustrated in FIG. 1. In the embodiment shown in FIG. 3, color calibration is controlled through user input at an input device 12 which, in this embodiment, is a computer 12 linked to printer 16. In the embodiment shown in FIG. 4, color calibration is controlled through user input at printer 16.

Referring to FIG. 3, computer 12 includes a processor 30, a volatile memory 32 (e.g., RAM), and a nonvolatile memory 34 (e.g., hard disk). Nonvolatile memory 34 provides storage for computer/processor-readable instructions, data structures, program modules and other data for computer 12. Computer 12 runs application programs 36 stored in memory 34 and executed by processor 30 that generate images and documents transferred electronically to printer 16 through communication link 18. Application programs 36 might include, for example, word processors, spread sheets, browsers, multimedia players, illustrators, and photo editing applications. Computer 12 also includes a printer driver 38 stored in nonvolatile memory 34 and executed by processor 30. As is typical of many printer drivers, printer driver 38 formats the images and documents from application programs 36, as necessary, into a page description language (PDL) such as Adobe PostScript or Hewlett Packard Printer Control Language (PCL) or another format suitable for use by printer 16. A user interface 40, typically a display screen, keyboard and mouse, allows a user to input data and control operation of computer 12.

Referring to FIGS. 3 and 4, printer 16 includes a print engine 42, a controller 44, and a user interface 46. Controller 44 processes print data from an input device (computer 12 in FIG. 3) and controls the output of printer 16 through print engine 42. Controller 44 includes a processor 48 and associated volatile memory 50 (e.g., random access memory), and a nonvolatile memory 52 (e.g., read only memory, flash memory, hard disk). Nonvolatile memory 52 stores programming, data structures, program modules and other data for printer 16. User interface 46, typically a small display screen (e.g., display 26 in FIG. 2) and keypad (e.g., keypad 28 in FIG. 2) or touch screen, gives the user local control over some printer operations. Print engine 42 represents generally the hardware and programming that utilizes print data from controller 44 to print the images and documents generated by application programs 36. A color map or set of color maps 54 is stored in memory 52 on controller 44. In order to print a particular color, printer 16 (through controller 44) must transform or "map" the color value received from the input device into a color command recognized by print engine 42. A series of Look Up Tables (LUTs) is typically used for this transformation.

A calibration module 56 controls color calibration on printer 16. Calibration module 56 includes the programming, data and controls for color calibration on printer 16, as described in detail below with reference to the embodiments shown in FIGS. 5-12. In the embodiment shown in FIG. 3, calibration module 56 resides on printer driver 38. In the embodiment shown in FIG. 4, calibration module 56 resides in memory 52 on printer controller 44.

Figure 5:
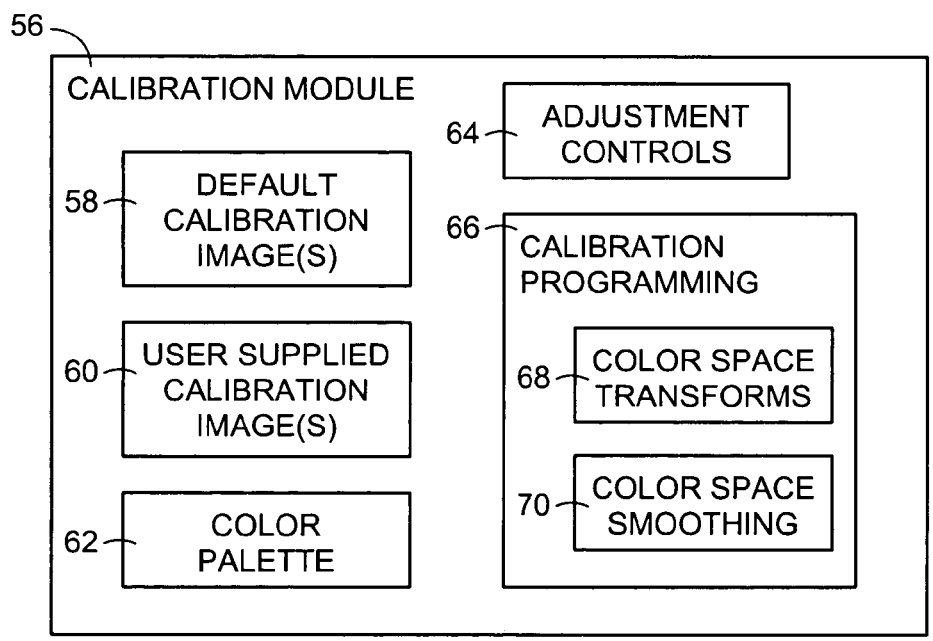
FIG. 5 is a block diagram showing components of a calibration module, such as the one shown in FIGS. 3 and 4, according to an embodiment of the invention.
Figure 7:
FIG. 7 is an image of different scenes with natural objects showing a variety of memory colors.

One embodiment of a calibration module 56 is illustrated in FIG. 5. Referring to FIG. 5, calibration module 56 includes default calibration image(s) 58 or user supplied calibration image(s) 60 and a palette 62 of memory colors from images 58 or 60. Exemplary calibration images are shown in FIG. 7. FIG. 7 shows black and white images. The actual calibration images, however, are color images. For example, the fruit image in FIG. 7 would show a yellow banana, a red apple, and an orange. Similarly, the image of the barn would show a red barn, green grass, and blue sky; the images of the four faces would show the respective skin tones for those faces; and the image of the children on the beach would show the color of sand for the beach, and the appropriate human skin tones for the children.) Calibration module 54 also includes adjustment controls 64 and calibration programming 66. Calibration programming 66 represents generally any programming capable of controlling color calibration on printer 16. In the embodiment shown in FIG. 5, calibration programming 66 includes programming for color space transforms, designated by part number 68, and programming for color space smoothing, designated by part number 70.

In the embodiments shown in FIGS. 3 and 4, all of the components of calibration module 56 reside on an input device 12 (FIG. 3) or on the printer 16 (FIG. 4). In another embodiment, illustrated in FIG. 6, the calibration images 58, 60, color palette 62 and adjustment controls 64 reside on computer 12 and the calibration programming module 66 resides on printer 16.

Figure 8:
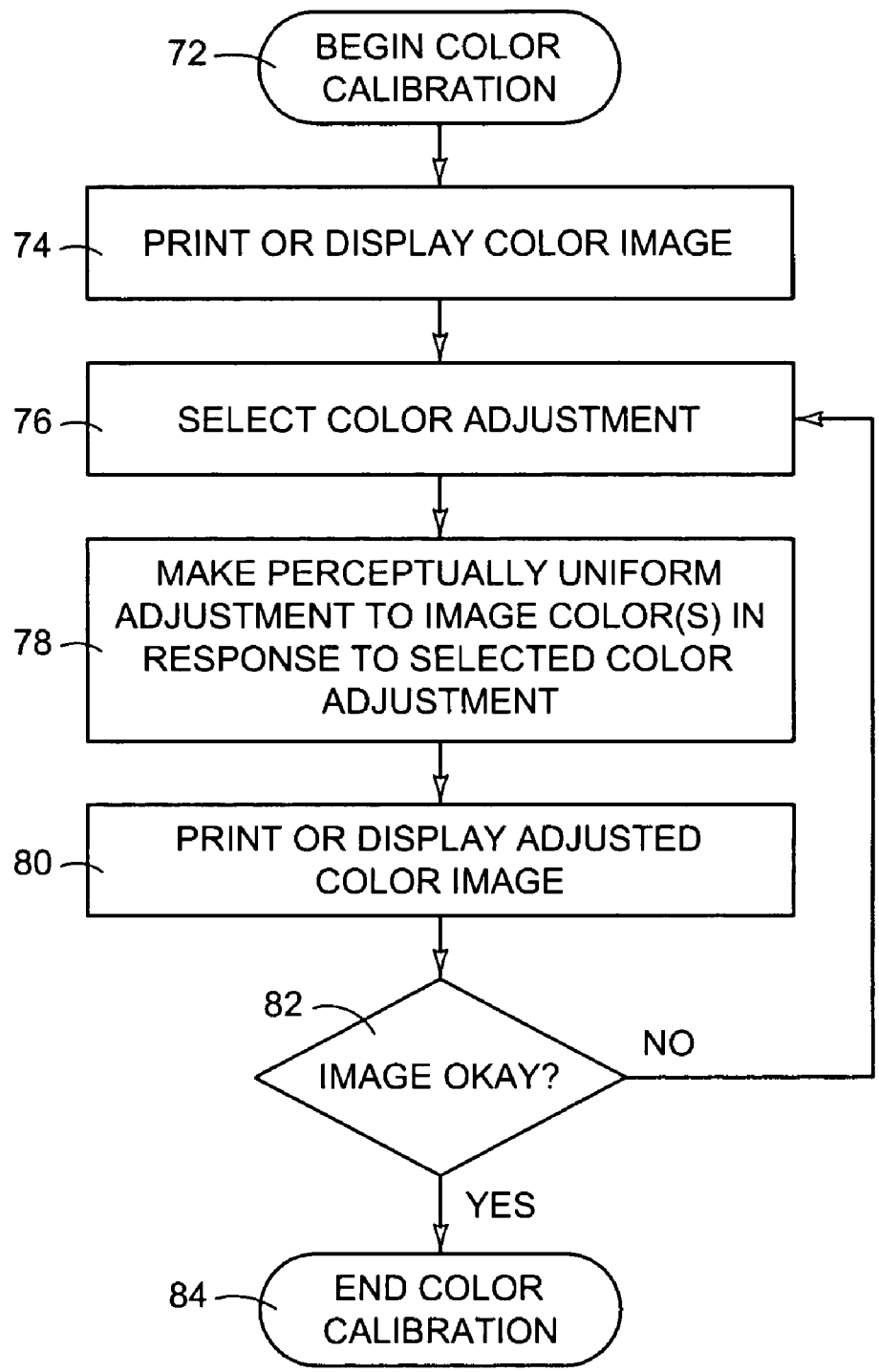
FIG. 8 is a flow chart of a color calibration method according to an embodiment of the invention in which perceptually uniform color adjustments are made to an image.

OPERATION: FIG. 8 is a flow chart illustrating a method embodiment of the invention. Although the method of FIG. 8 will be discussed with reference to components illustrated in FIGS. 2-7, other components could be used to carry out the steps shown in FIG. 8. Referring to FIG. 8, color calibration begins (step 72) by, for example, selecting a color calibration option from a menu supplied by printer driver 38 if calibration module 56 resides on computer 12 (through computer user interface 40, FIG. 3) or from a menu on printer user interface 46 if calibration module 56 resides on printer 16 (FIG. 4). A color image is printed at printer 16 or displayed at computer user interface 40 (step 74). The user selects a desired adjustment to one or more of the colors in the image through, for example, a prompt or menu on computer user interface 40 or printer user interface 46. A perceptually uniform adjustment is made in response to the color adjustment selected by the user (step 78) and the adjusted color image is printed at printer 16 or displayed at computer user interface 40 (step 80). If the adjusted color image is acceptable at step 82, then the color calibration ends (step 84). If the adjusted color image is not acceptable, then the selecting, adjusting and printing/displaying steps 76, 78 and 80 are repeated until the image is found to be acceptable at step 82.

As used in this document, "perceptually uniform" means that the perceived change in a color is directly proportional to the increment of change selected to adjust the color. Hence, the change from the original color image printed or displayed in step 74 to the adjusted color image printed or displayed in step 80 will be perceived in the same proportion as the adjustment selected in step 78. For example, if the user selects an adjustment to make the green apples in the fruit image of FIG. 7 more green by an increment of four, then the apples in the adjusted color image will appear more green by a factor of two over an increment of two and more green by a factor of four over an increment of one. In one embodiment, described below with reference to FIG. 10, perceptually uniform adjustment is achieved by making the adjustment in a perceptually uniform color modeling space and then transforming the adjusted color to the printer or display color modeling space. The use of perceptually uniform color adjustments can be very accurate with fewer adjustment iterations because the adjustment relates to the color perception of the user rather than the behavioral constraints of the printer or display device. The use of memory colors discussed below with reference to FIGS. 9 and 10 also helps the user more efficiently adjust the image to obtain the desire color.

Figure 9:
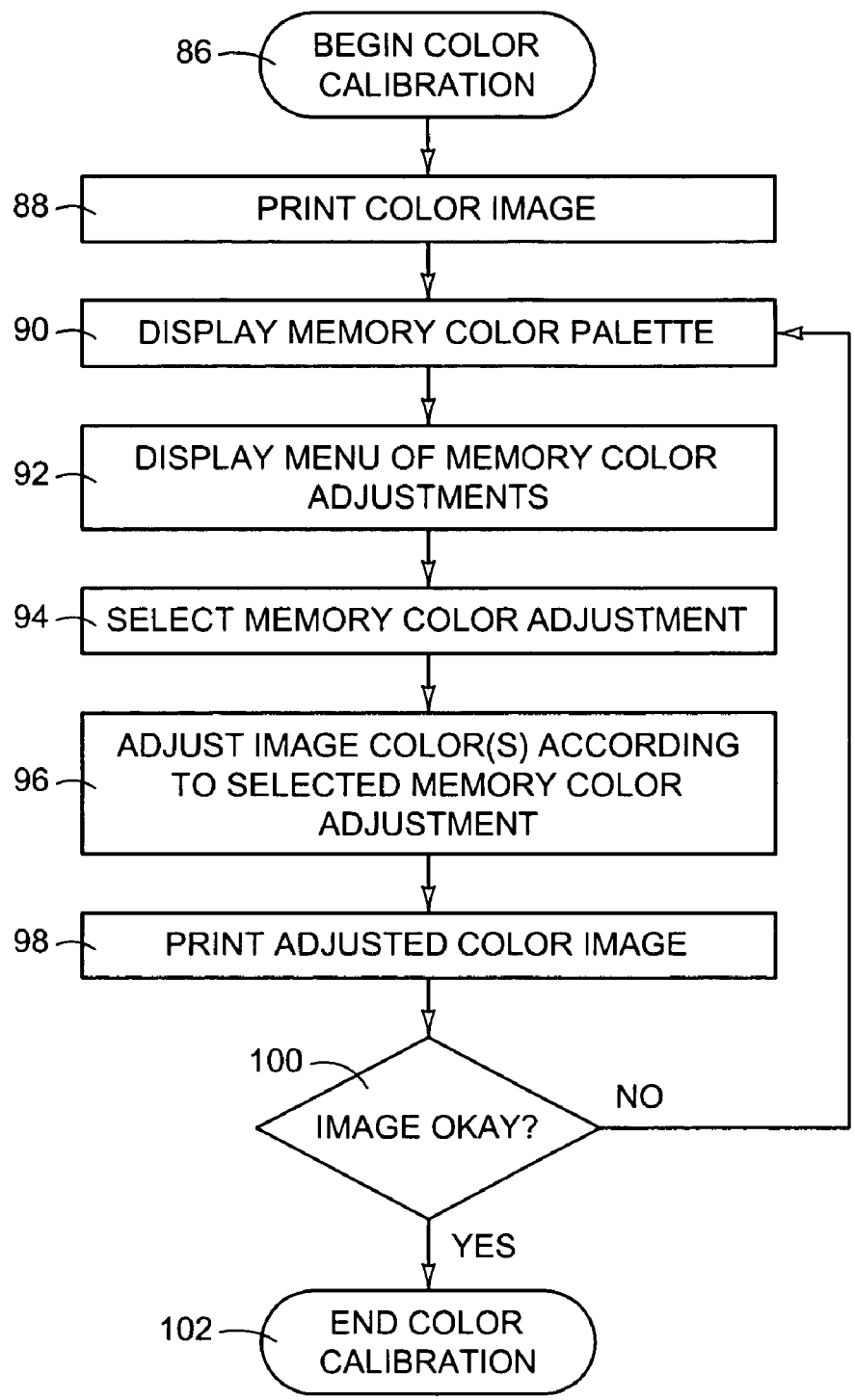
FIG. 9 is a flow chart of a color calibration method according to an embodiment of the invention in which memory color adjustments are made to an image.

FIG. 9 is a flow chart illustrating another method embodiment. Referring to FIG. 9, color calibration begins (step 86) and a color image is printed (step 88). A palette of memory colors and a menu of memory color adjustments are displayed (steps 90 and 92, respectively). The palette of memory colors may be displayed along with the menu of memory color adjustments, or they may be displayed separately. For example, in the computer user interface display illustrated in FIG. 12 includes both a memory color palette (as a scroll menu) and a scroll menu of memory color adjustments. By contrast, in the memory color palette and the menu of memory color adjustments are displayed separately in the printer user interface display shown in FIGS. 13-16. Once the user has selected the desired memory color adjustment (step 94), the image color is adjusted according to the selected memory color adjustment (step 96), and the adjusted image is printed (step 98). If the adjusted color image is acceptable at step 100, then the calibrating ends (step 102). If the adjusted color image is not acceptable, then the displaying, selecting, adjusting and printing steps 90, 92, 94, 96 and 98 are repeated until the image is found to be acceptable at step 100.

Figure 10:
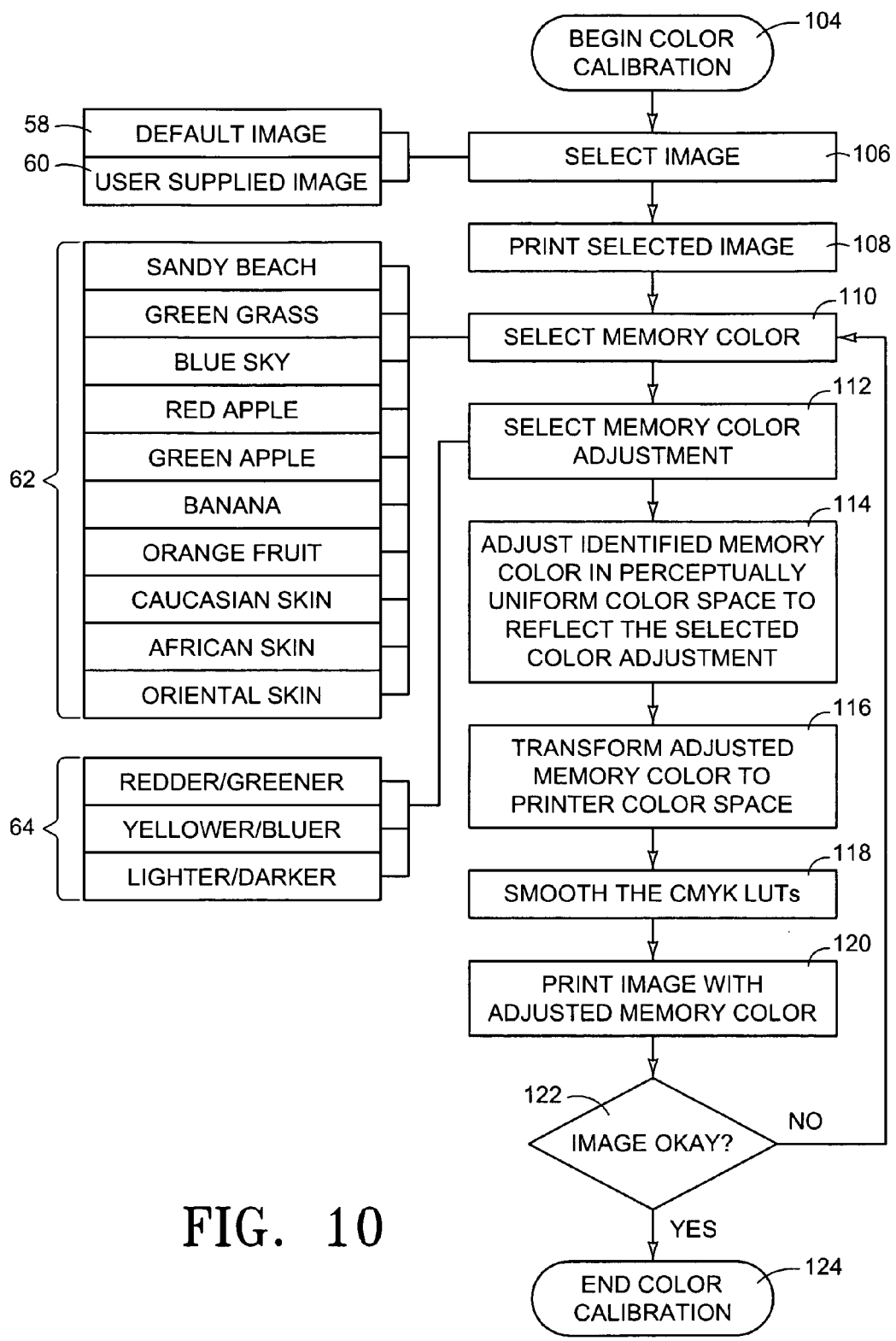
FIG. 10 is a flow chart of a color calibration method according to an embodiment of the invention in which perceptually uniform memory color adjustments are made to an image.
Figure 13:
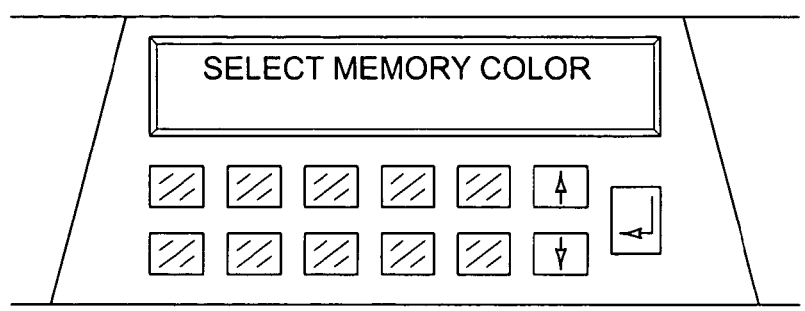
FIGS. 13 and 14 illustrate a printer user interface display for the memory color selecting step of FIG. 11.
Figure 14:
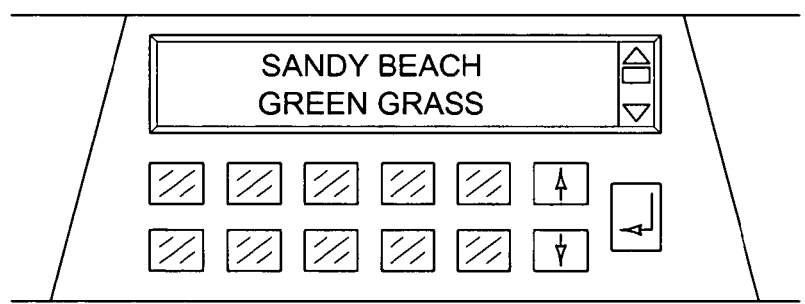

FIG. 10 is a flow chart illustrating another method embodiment. Referring to FIG. 10, color calibration begins (step 104) and a calibration image is selected (step 106) from one of a default image 58 supplied by calibration module 56 (FIG. 5) and a user supplied calibration image 60. The selected image is printed (step 108) and a memory color is selected (step 110) from a palette 62 of memory colors that appear in the selected image. For example, color palette 62 in FIG. 10 includes memory colors that appear in the calibration images shown in FIG. 7. While it is expected that color palette 62 will usually be implemented as a scroll menu of colors displayed on computer user interface 40, as shown in FIG. 12, or a scroll menu of colors displayed on printer user interface 46, as shown in FIGS. 13 and 14, any implementation that allows the user to select a memory color or group of memory colors may be used.

A perceptually uniform memory color adjustment is selected (step 112) from adjustment controls 64. In the embodiment shown in FIG. 10, adjustment controls 64 represent color control in the CIELab color model (CIE stands for the Commission Internationale de l'Eclairage—the International Commission on Illumination). CIELab is a well known and popular color model in which the distance between colors in the modeling space corresponds closely to the distance between colors perceived by the human eye. That is to say, CIELab is a perceptually uniform color model. In the CIELab color model, colors are defined with reference to three axes—lightness (L), red/green (a) and yellow/blue (b). Hence, adjustment controls 64 allow the user to adjust colors along each of the three CIELab axes by choosing to make the color redder or greener (adjusting the color +/− along the a axis), yellower or bluer (adjusting the color +/− along the b axis) and lighter or darker (adjusting the color along the L axis). Perceptually uniform color models other than CIELab could also be used.

Figure 12:
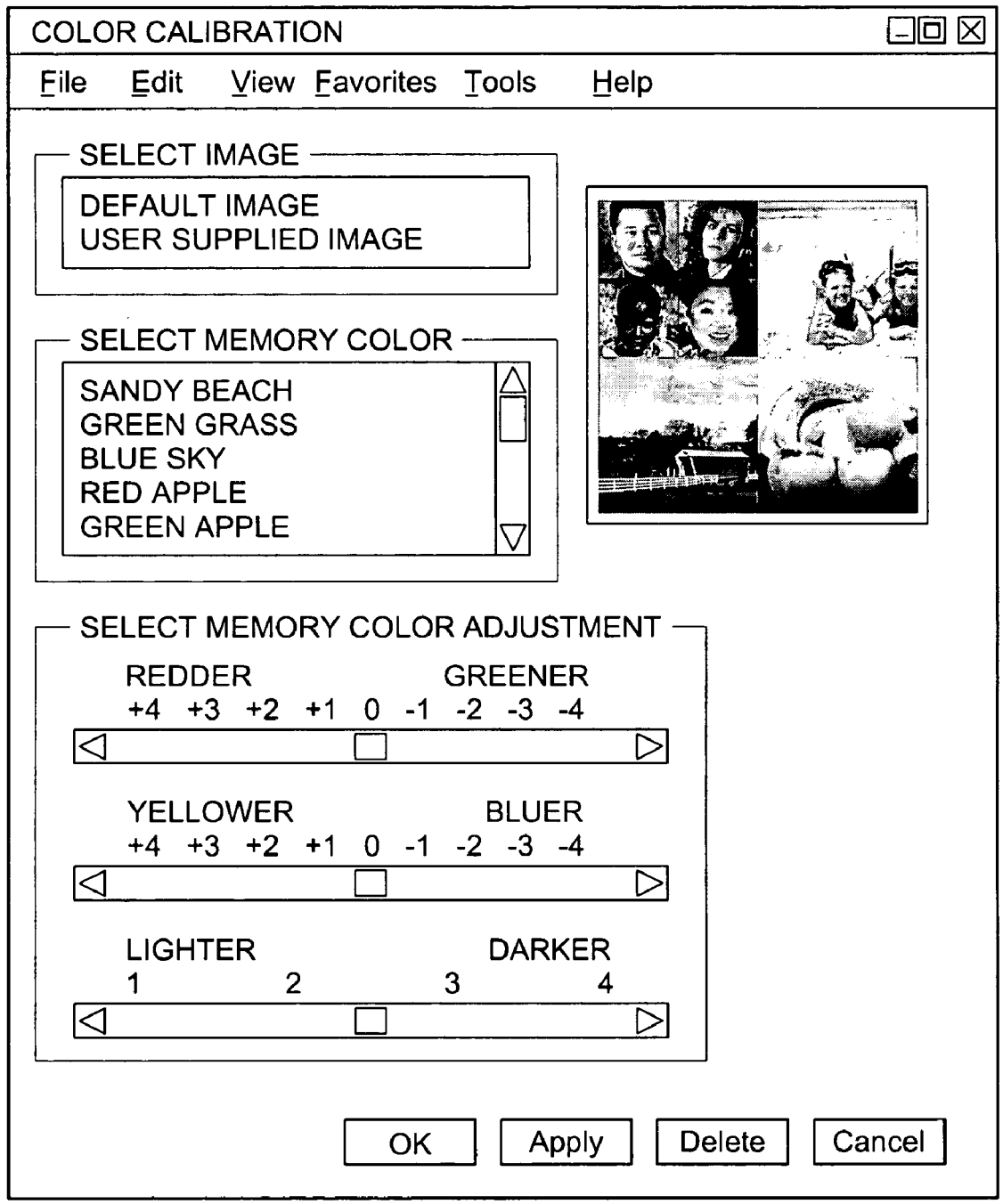
FIG. 12 illustrates a computer user interface display for the selecting steps of FIG. 11.
Figure 15:
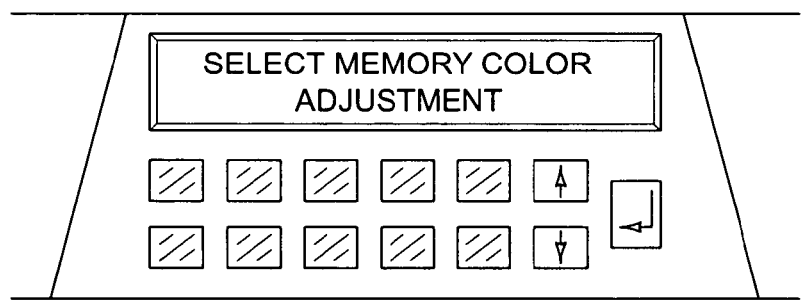
FIGS. 15 and 16 illustrate a printer user interface display for the memory color adjustment step of FIG. 11.
Figure 16:
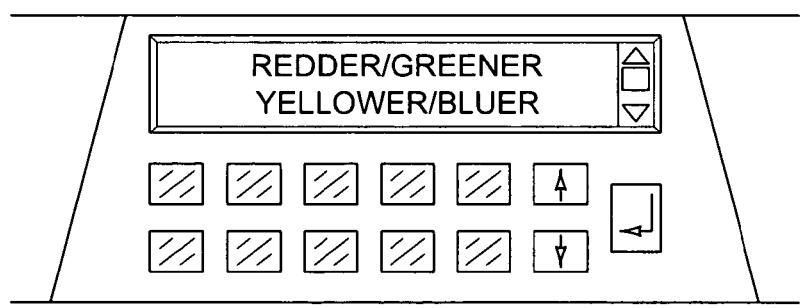

While it is expected that adjustment controls 64 will usually be implemented as a scroll menu displayed on computer user interface 40, as shown in FIG. 12, or a scroll menu of colors displayed on printer user interface 46, as shown in FIGS. 15 and 16, any implementation that allows the user to select the desired memory color adjustment may be used.

The memory colors in default images 58 are known and, therefore, those memory colors may be pre-mapped to a perceptually uniform color model. For example, if the CIELab color model is used, then each memory color in default images 58 is defined in palette 62 as the corresponding CIELab color value by code embedded in palette 62 or through calibration programming 66. The original CIELab memory color value, represented by "a" in Equation 1 below, is adjusted an increment Δa according to the adjustment selected in step 112 (step 114). The adjusted CIELab color value, "b" in Equation 1, is transformed into the corresponding printer color model value (step 116) and smoothed as necessary or desirable to reduce any discontinuities introduced through the CIELab to CMYK transformation (step 118). The image is then printed with the adjusted memory color (step 120). If the adjusted color image is acceptable at step 122, then the calibrating ends (step 124). If the adjusted color image is not acceptable, then the selecting, identifying, adjusting, transforming, smoothing and printing steps 110-120 are repeated until the image is found to be acceptable at step 122.

Since the adjustment is made in CIELab (or another perceptually uniform color model space), the approximate color difference between the original color and the adjusted color may be represented as the sum of the original CIELab color value and the adjustment increment, as shown in Equation 1, $$b = a + \Delta a \qquad \text{Equation 1}$$

where a is the original CIELab color value, Δa is the adjustment increment, and b is the adjusted CIELab color value. CMYK printer color values are represented by a quadruplet vector defined by four one-dimensional Look Up Tables (LUTs) operating independently on each CMYK printer color model coordinate/channel. The CMYK printer color value quadruplet vector z is defined by Equation 2.

$$z = L(G) \qquad \text{Equation 2}$$

where L represents the four LUTs and G represents the CIELab to CMYK transformation function. In the analysis below, the four LUTs are designated LUT_C, LUT_M, LUT_Y, and LUT_K. The adjustment make to the CIELab color value is applied to the CMYK printer color model by modifying the LUTs. The point in each LUT corresponding to the memory color selected for adjustment is assigned a new value, as shown in Equations 3-6.

$$\text{LUT\_C}(G(a)_c) = G(b)_c \qquad \text{Equation 3}$$

$$\text{LUT\_M}(G(a)_m) = G(b)_m \qquad \text{Equation 4}$$

$$\text{LUT\_Y}(G(a)_y) = G(b)_y \qquad \text{Equation 5}$$

$$\text{LUT\_K}(G(a)_k) = G(b)_k \qquad \text{Equation 6}$$

Equations 3-6 represent the adjustment to values in the original LUT for each coordinate/channel.

Figure 17:
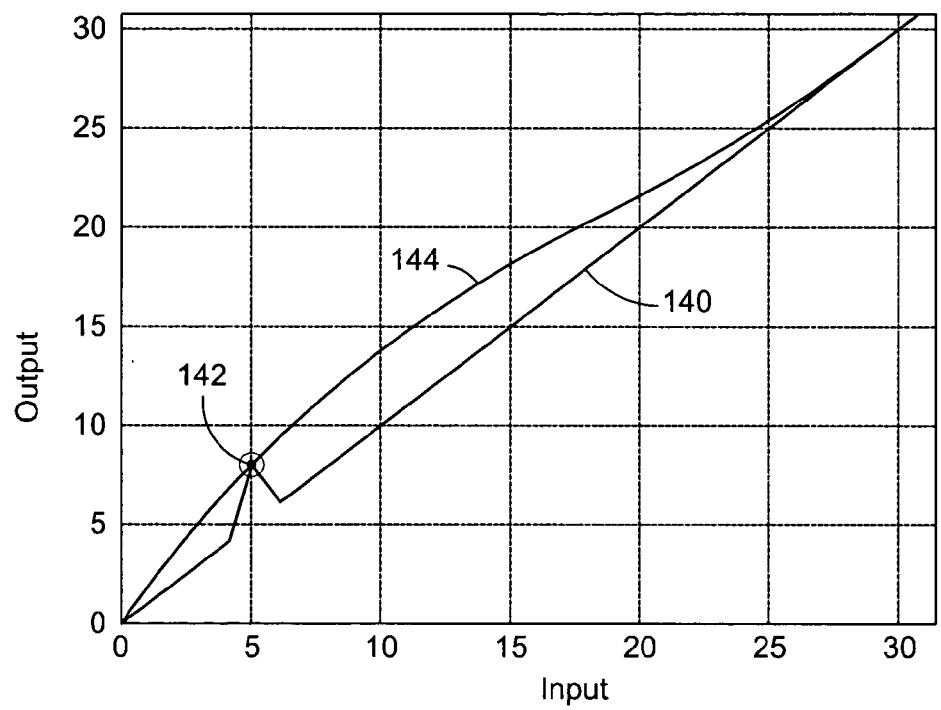
FIG. 17 is a graph of a first adjustment applied to an originally linear LUT, in terms of output to LUT versus input to LUT.
Figure 18:
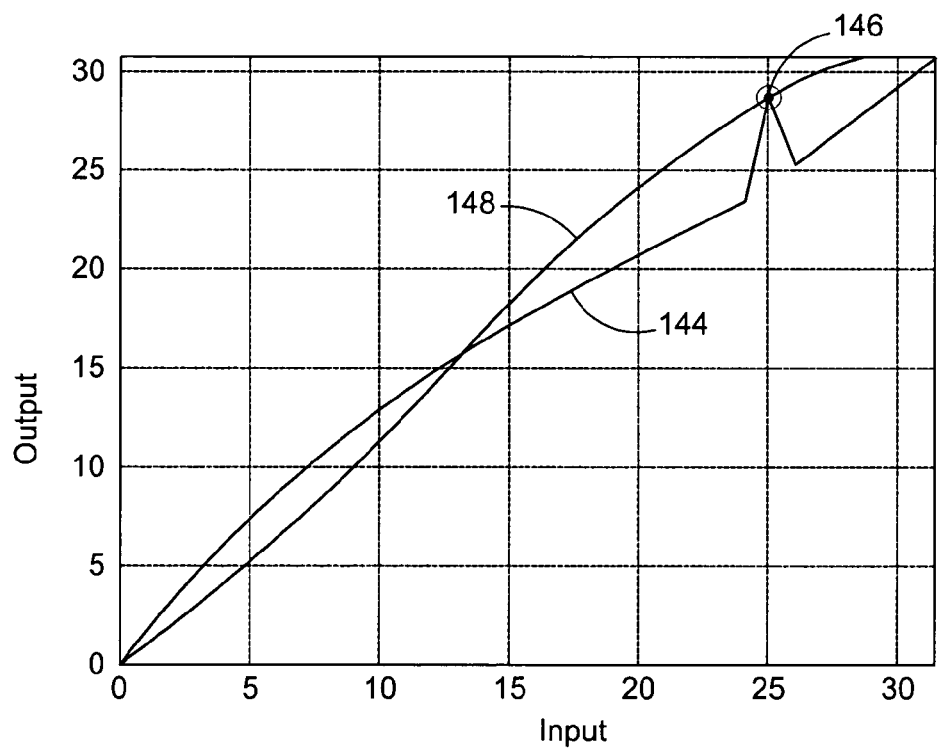
FIG. 18 is a graph of a subsequent adjustment made to another region of the LUT, in terms of output to LUT versus input to LUT.

FIGS. 17 and 18 are graphical representations of an LUT for one coordinate/channel of a CMYK color value (e.g., the LUT_C, LUT_M, LUT_Y or LUT_K). Although the LUTs are one-dimensional, they are depicted in two dimensions to better illustrate the effect of user calibration through adjustment and smoothing. Referring first to FIG. 17, the color values along curve 140 correspond to the memory color values in the LUT before adjustment. Curve 140 is a straight line reflecting a neutral position in which the input and output match. That is to say, if a color intensity/strength level of 5, for example, is input, then the LUT yields a color intensity/ strength of 5. The circled point 142 in FIG. 17 corresponds to a memory color adjustment selected by the user in step 112 and implemented in steps 114 and 116. The adjustment causes an abrupt discontinuity in the original curve 140 at the point of adjustment. This discontinuity reflects the change in the intensity of the constituent color (C, M, Y or K) necessary to print an image corresponding to the selected memory color adjustment. LUTs with such discontinuities degrade print quality because good image reproduction requires substantially smooth LUT color transforms. The discontinuity is removed, therefore, by smoothing the LUT/curve (step 118 in FIG. 10) according to Equations 7-10 to produce a substantially smooth adjusted curve 144 in each of the color channels.

FIG. 18 shows the LUT of FIG. 14 after a second color adjustment. The circled point 146 on once-adjusted curve 144 in FIG. 18 corresponds to a second memory color adjustment selected by the user. Again, the adjustment causes an abrupt discontinuity in curve 144 at the point of adjustment and the discontinuity is removed to produce another smooth and further adjusted curve 148. This process is repeated until the user is satisfied with the adjusted image printed at step 118 in FIG. 10.

Equations 7-10 illustrate one method for smoothing LUT color curves by adjusting the value of points surrounding the discontinuity.

$$LUT\_C = S(LUT\_C, n, G(a)_c) \qquad \text{Equation 7}$$

$$LUT\_M = S(LUT\_M, n, G(a)_m) \qquad \text{Equation 8}$$

$$LUT\_Y = S(LUT\_Y, n, G(a)_y) \qquad \text{Equation 9}$$

$$LUT\_K = S(LUT\_K, n, G(a)_k) \qquad \text{Equation 10}$$

In Equations 7-10, S represents a coarse sub-sampling function followed by a spline-based super-sampling function. Each of Equations 7-10 represents this operation performed on each coordinate/channel.

In Function 1 below, n is the number of levels of the LUT, and p is the point in the LUT that has been adjusted. ov is the size of the LUT. $sv_0$ is the value in the LUT where the color intensity is zero—no ink or toner is applied to the print media. $sv_1$ is a mid point between $sv_0$ and $sv_2$. $sv_2$ is the value at the user adjusted point. $sv_3$ is a minimum value at p+n/2. $sv_4$ is the value at the highest level in the channel for the LUT. $LUT_{out}$ is a clamping and non-decreasing function to supplement the common spline function by removing splining artifacts. Thus, Function 1 outlines S.

$$LUT_{out} = S(LUT_{in}, n, p) \qquad \text{Function 1}$$

ov=[0, 1, 2, . . . n−1]
$sv_0 = 0$
$sv_1 = \text{maximum}(p-n/2, 0)$
$sv_2 = p$
$sv_3 = \text{minimum}(p+n/2, n)$
$sv_4 = n$
$LUT_{out} = \text{nondec}(\text{clip}(\text{spline}(sv, LUT_{in}(sv), ov), 0, n))$ Functions 2-4 are embedded in S. $LUT_{out}$ represents the non-decreasing function "nondec" applied to the LUT. The "clip" function indicates that there cannot be values outside the look-up table.

$$LUT_{out} = \text{nondec}(LUT_{in}) \qquad \text{Function 2}$$

ov=[0, 1, 2, . . . n−1]
if $LUT_{in}(ov) < LUT_{in}(ov-1)$, then $LUT_{out}(ov) = LUT_{in}(ov-1)$ $$LUT_{out} = \text{clip}(LUT_{in}, L, U) \qquad \text{Function 3}$$

ov=[0, 1, 2, . . . n−1]
if $LUT_{in}(ov) < L$, then $LUT_{out}(ov) = L$
else if $LUT_{in}(ov) > U$, then $LUT_{out}(ov) = U$
else if $LUT_{out}(ov) = LUT_{in}(Ov)$ $$LUT_{out} = \text{spline}(sv, LUT_{in}(sv), ov) \qquad \text{Function 4}$$

Function 2 represents the non-decreasing aspect of the LUT, by indicating that if an LUT value is less than an LUT value directly to the left, then the LUT value is assigned that value of the LUT that is directly to the left. Function 3 indicates a clip function wherein if the spline function generates a negative value, then the negative value is replaced by a zero. More information on numerical methods such as spline functions, see *Applied Numerical Methods For Engineers*: Robert J. Schilling, Sandra L. Harris; Brooks/Cole Publishing Company; pp. 162, 163; 2000.

Referring again to FIG. 10, if a user supplied calibration image 60 is selected and printed at steps 106 and 108, then the results of the calibration will vary depending on the degree to which colors in the user supplied image 60 match memory colors found in palette 62. If user supplied image 60 contains colors that exactly or closely match the memory colors in palette 62, then the calibration process may proceed as described above for default image 58 with good results. Since a memory color must be selected from palette 62, if colors in the user supplied image 60 do not match the memory colors in palette 62 closely, the results of the calibration will be correspondingly less exact.

Figure 11:
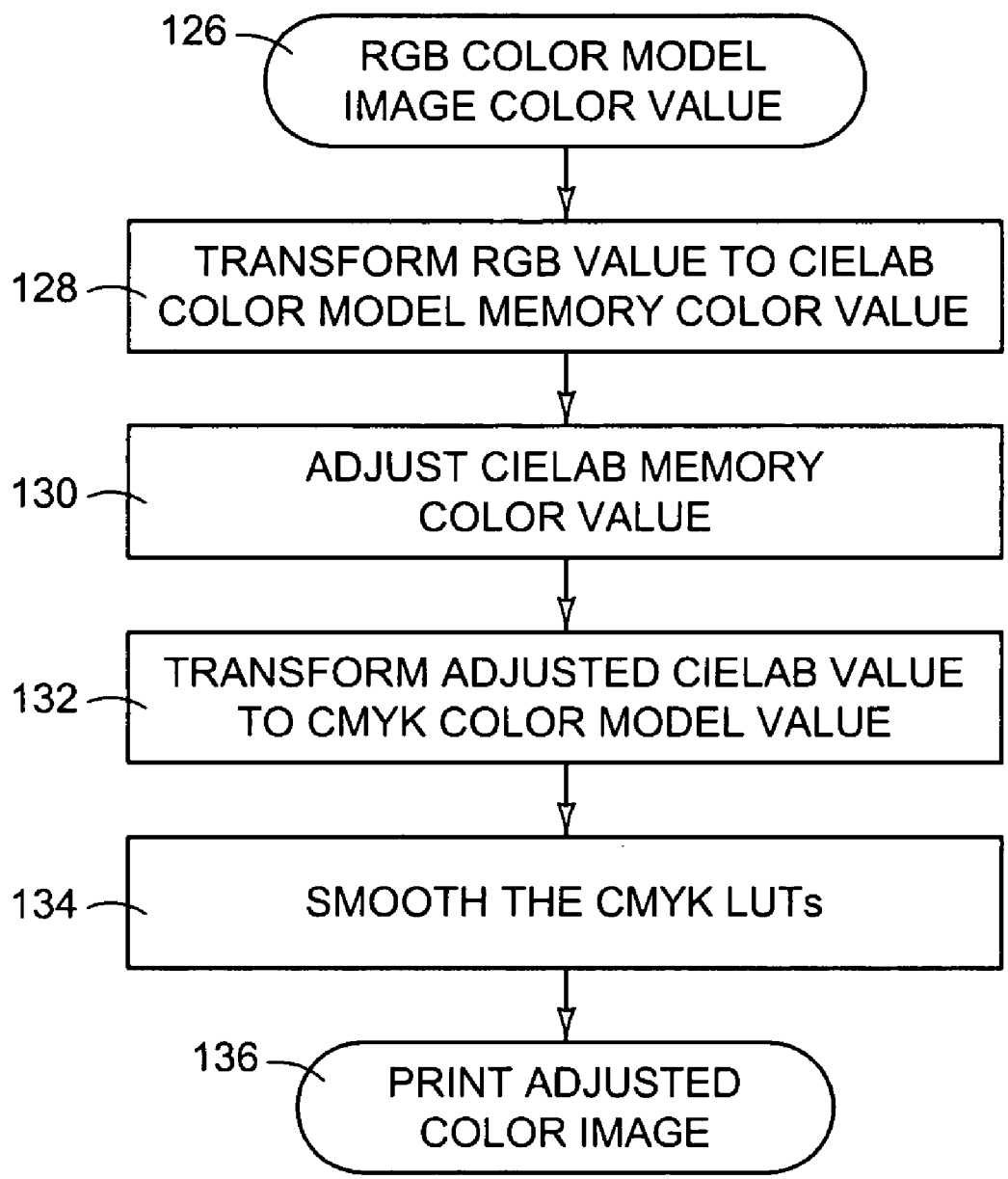
FIG. 11 is a flow chart of a method for transforming an image from an RGB color model to a CMYK color model.

FIG. 11 illustrates one exemplary method for adjusting a memory color when the color calibration image is stored as an RGB (Red, Green, Blue) color model image. Adjustments to the printed image are still accomplished using CIELab or another perceptually uniform color model after transforming the RGB color value to a CIELab color value. Referring to FIG. 11, the adjustment process begins with an RGB color value representing the selected memory color (step 126). The RGB color value is transformed into a CIELab memory color value (step 128) and the CIELab color value is adjusted according to the selected memory color adjustment (step 130). The adjusted CIELab color value is transformed into a CMYK color value (step 132) that can be used by a printer 16 to print the adjusted color image (step 136). Again, where necessary or desirable to improve the printed image, the adjusted CMYK memory color LUTs are smoothed (step 134) to reduce any discontinuities introduced through the CIELab to CMYK transformation.

Figure 6:
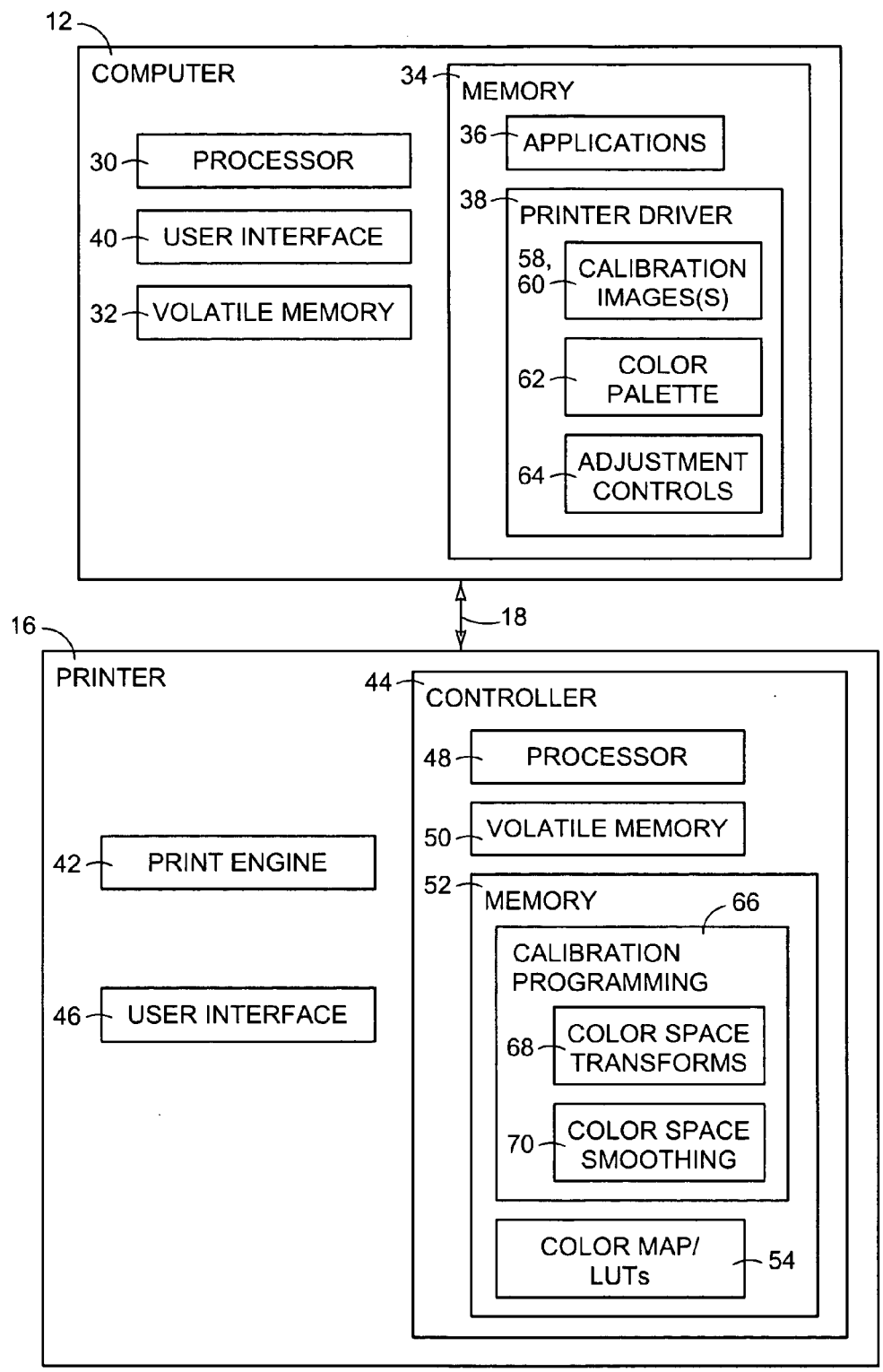
FIG. 6 is a block diagram showing components of a printer and client computer, such as the printer and input devices illustrated in the printing system of FIG. 1, according to an embodiment of the invention in which the calibration images, color palette and adjustment controls reside on the client computer and the calibration programming resides on the printer.

For the programming architecture illustrated in FIGS. 5 and 6, the transformation and smoothing steps described above are carried out through the color space transform programming module 68 and color space smoothing module 70 within calibration programming 66.

In the block diagrams of FIGS. 3-6, each programming block may represent a module, segment, or portion of code that comprises one or more executable instructions to implement the specified function(s). If the programming is embodied in hardware, each block may represent a circuit or a number of interconnected circuits to implement the specified function(s). Embodiments of the present invention may be implemented in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain programs and data for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A color calibration method, comprising:
   storing a color image in an RGB color modeling space;
   printing the color image;
   prompting a user to select a memory color appearing in the image;
   prompting the user to select an adjustment to the selected memory color;
   in response to the user selecting a memory color, transforming an RGB model color value representing the selected memory color to a CIELab model color value;
   in response to the user selecting an adjustment to the memory color, adjusting the CIELab model color value;
   transforming the adjusted CIELab model color value to a CMYK model color value; and
   printing an adjusted color image based on the CMYK model color value.

2. The method of claim 1, further comprising, after transforming the CIELab model color value to a CMYK model color value, smoothing a discontinuity in an LUT of CMYK color values associated with the transformation of the adjusted CIELab model color value to the CMYK model color value.

3. A computer readable medium having instructions thereon for:
   storing a color image in an RGB color modeling space;
   printing the color image;
   prompting a user to select a memory color appearing in the image;
   prompting the user to select an adjustment to the selected memory color;
   in response to the user selecting a memory color, transforming an RGB model color value representing the selected memory color to a CIELab model color value;
   in response to the user selecting an adjustment to the memory color, adjusting the CIELab model color value;
   transforming the adjusted CIELab model color value to a CMYK model color value; and
   printing an adjusted color image based on the CMYK model color value.

4. The medium of claim 3, further comprising instructions for, after transforming the CIELab model color value to a CMYK model color value, smoothing a discontinuity in an LUT of CMYK color values associated with the transformation of the adjusted CIELab model color value to the CMYK model color value.

* * * * *

UNITED STATES PATENT AND TRADEMARK OFFICE
CERTIFICATE OF CORRECTION

PATENT NO. : 7,525,684 B2  Page 1 of 1
APPLICATION NO. : 10/685276
DATED : April 28, 2009
INVENTOR(S) : Peter I. Majewicz It is certified that error appears in the above-identified patent and that said Letters Patent is hereby corrected as shown below:

In columns 8 and 9, lines 66-67 and 1-2 respectively, after "execution system." delete "The computer readable medium can comprise any one of many physical media such as, for example, electronic, magnetic, optical, electromagnetic, infrared, or semiconductor media.".

Signed and Sealed this

Eighth Day of September, 2009

David J. Kappos
*Director of the United States Patent and Trademark Office*